United States Patent [19]

Hanna et al.

[11] Patent Number: 5,039,025
[45] Date of Patent: Aug. 13, 1991

[54] SAFETY BELT MECHANISM

[75] Inventors: Harry Hanna, Armagh; William E. Heaney, Bangor, both of Northern Ireland

[73] Assignee: European Components Corporation, Northern Ireland

[21] Appl. No.: 480,159

[22] Filed: Feb. 14, 1990

[30] Foreign Application Priority Data

Feb. 16, 1989 [GB] United Kingdom ............... 8903570
Oct. 10, 1989 [GB] United Kingdom ............... 8922789

[51] Int. Cl.$^5$ .................................... B65H 75/48
[52] U.S. Cl. ............................................ 242/107.200
[58] Field of Search ............ 242/107.2, 107.3, 107.12, 242/107.7, 107.65, 107.4 A, 107.4 B; 280/806, 808

[56] References Cited

U.S. PATENT DOCUMENTS

| | | | |
|---|---|---|---|
| 3,494,571 | 2/1970 | Stoffel | 242/107.2 |
| 4,036,322 | 7/1977 | Takada | 280/806 |
| 4,241,886 | 12/1980 | Maekawa et al. | 242/107.14 A X |
| 4,243,185 | 1/1981 | Motonami et al. | 242/107.2 |
| 4,371,126 | 2/1983 | Tsuge et al. | 242/107.4 A X |
| 4,564,154 | 2/1986 | Takada | 242/107.4 B |
| 4,570,975 | 2/1986 | Kawaguchi et al. | 280/806 |
| 4,667,981 | 5/1987 | Koide | 242/107.2 X |
| 4,854,644 | 8/1989 | Ernst | 242/107.2 X |
| 4,899,949 | 2/1990 | Meyer et al. | 242/107.4 A X |

FOREIGN PATENT DOCUMENTS

| | | | |
|---|---|---|---|
| 3110068 | 2/1982 | Fed. Rep. of Germany | 242/107.2 |
| 3539280 | 5/1987 | Fed. Rep. of Germany | 242/107.2 |
| 2042053 | 9/1980 | United Kingdom | 242/107.2 |
| 2073008 | 10/1981 | United Kingdom | 242/107.4 B |
| 8203991 | 11/1982 | World Int. Prop. O. | 242/107.4 B |

Primary Examiner—Daniel P. Stodola
Assistant Examiner—John P. Darling
Attorney, Agent, or Firm—Lyon & Delevie

[57] ABSTRACT

A retainer mechanism for a safety belt includes a retraction reel on which the safety belt web is wound and first and second locking members mounted adjacent the reel and movable relative to the frame to clamp the web itself or allow the web to move. Displacement of the second locking member, and thus of the first locking member, may be caused e.g. by an inertia mechanism on the reel and/or by an acceleration/de-celeration sensitive mechanism and/or by a projection adjacent the end of the web.

6 Claims, 7 Drawing Sheets

SAFETY BELT MECHANISM

This invention relates to safety belts such as are used as passenger restraints in vehicles. It is particularly concerned with a retaining mechanism of such safety belts.

The use of inertia reel safety belts has become widespread in road vehicles. In these, a spindle carrying the belt web is provided with a locking retractor mechanism which comprises a return spring to wind the web onto the spindle and a locking means that prevents web being drawn off if the wearer of the belt is thrown forwards, so as to restrain him in a crash.

It has also been proposed to provide a retainer mechanism for a safety belt comprising a frame, and mounted on the frame, a retraction reel for the belt web, a pair of members having opposed faces between which the web extends, the members being resiliently biased to a position in which the opposed faces are spaced apart to provide a free travel path for the web, and means to cause displacement of the members against said bias, to move said faces relatively towards one another, to clamp the web between them, and to retain the web clamped while it is held under tension.

Such a structure can act to clamp the belt and restrain the driver or passenger, rather more quickly than the conventional frame locking mechanism. However, such structures can be rather expensive and more bulky than the conventional mechanism.

According to the present invention the locking members comprise first and second locking members which are each movable each relative to the frame, so that the second locking member is mounted for translational sliding movement relative to said frame and said means to cause relative movement of said locking members acts on said second member, movement of which causes said first member to move, whereby its face is moved towards the face of the first member to clamp the web therebetween.

Such a structure can be made at a price similar to that of a conventional frame locking retractor and can be made so that it is not significantly larger than such a frame locking retractor.

In one construction according to the invention the locking members have complementary curved concave and convex opposing faces and the first locking member is pivotally mounted on the frame and includes the concave face, the second locking member being axially slidable on the frame and the translational movement of the second locking member causes the first locking member to pivot so that its concave face is brought closer to the convex face of the second locking member.

In an alternative structure, the first locking member is also mounted for translational sliding movement relative to the frame, the first locking member being provided with an inclined surface, angled with respect to its face, and the frame further comprises a cooperating surface engaged by said inclined surface, whereby translational movement of said first locking member urges said first locking member towards said second locking member. To facilitate this, the first locking member preferably includes a lost motion link with said second locking member, whereby movement of the second locking member causes firstly a parallel movement of the first locking member and secondly a transverse movement thereof towards said second locking member.

This form of structure can be made very inexpensively and its size can be not significantly different from that of a conventional frame locking retractor.

Preferably the means for locking the web are placed adjacent the reel. To protect a safety belt against damage when the web has been unreeled from the spindle, it is required to ensure that the belt tension cannot put too great a strain on the spindle through the end of the web that remains attached to it.

To achieve this, the means to cause said displacement of the second locking member against the bias comprise a transversely projecting element on the web, engageable with one of said locking members to move it relative to the other.

Alternatively or additionally the means to cause relative displacement of the members against said bias include, means sensitive to the speed of rotation of said reel whereby when the speed exceeds a certain value, said members are moved relatively towards one another.

These means sensitive to the speed of rotation of the reel may comprise an inertia mass and a ratchet wheel held together by clips which permit them to rotate relatively to each other about the axis of the reel, a torsion spring attached to the ratchet wheel and the inertia mass to constrain relative motion therebetween, a sensing disc attached to the reel, a sensing pawl pivotally mounted on the sensing disc, a control disc freely rotatable about the axis of the reel, ratchet teeth opposed to the pawl and a spring biasing the pawl out of engagement with the ratchet teeth, whereby when the inertia mass is moved, due to sufficient speed of rotation of the reel, the pawl is pivoted, against the action of said spring, so that it engages the ratchet teeth and causes the control disc to rotate, rotation of the control disc causing movement of one of said second locking member.

Again, alternatively or additionally the means to cause displacement of said second member against said bias comprise a ratchet wheel carried by said reel, a pivotally mounted lever, a detent carried by said lever and engageable with the teeth of said ratchet wheel, a cage, a ball moveable in said cage upon acceleration, deceleration or cornering of the vehicle in which the mechanism is mounted, to move said detent into engagement with said ratchet teeth to prevent rotation thereof, whereafter any unreeling of the web will cause the inertia mass to continue to rotate and engage the pawl in the control disc thereby to move the second locking member.

By way of example, an embodiment of the invention will now be described with reference to the accompanying drawings, in which.

Figure 1:
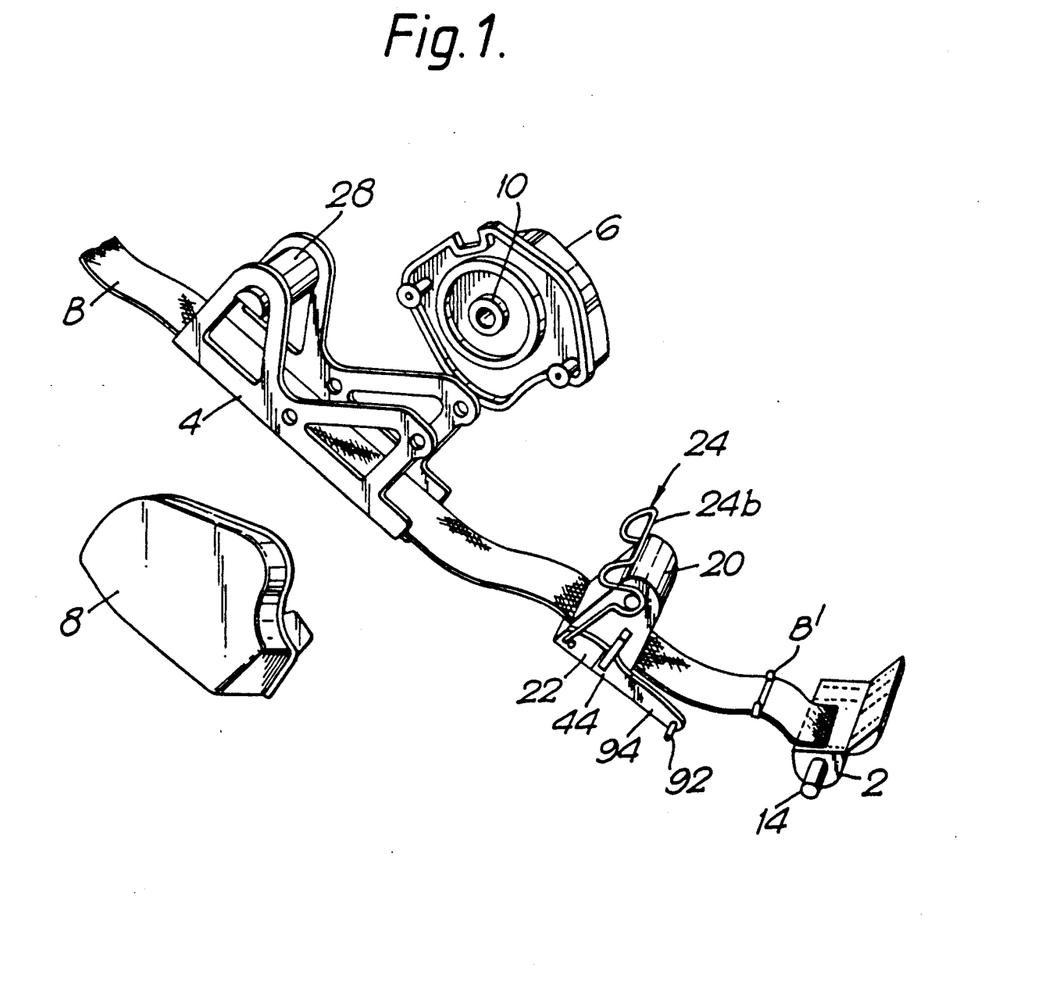
FIG. 1 is an exploded view of the main components of one embodiment of safety belt retainer mechanism according to the invention.

The retraction mechanism comprises a spindle 2 on which the belt web B is wound. The spindle 2 is located between side faces of a frame 4 on which it is held between a spring cassette 6 and a mechanism cassette 8. These cassettes are secured to opposite sides of the frame and each has a hub 10, 12 respectively. The hubs, which are engaged by opposite ends of the spindle 2, rotate with the spindle.

Located between the side walls 18 of the frame 4 is a locking mechanism for the run of the web from the spool. This has first and second locking members 20, 22 between which the web passes and a spring 24 holding the members in place. The first member 20 has an arcuate top face 26 that seats into a corresponding arcuate cradle 28 which is integral with the frame and extends between its side walls. The member 20 is held against the cradle by the spring 24 which has two U-shaped central portions 24a joined by a bridge 24b engaging the curved outer face of the cradle 28. Projecting from opposite sides of the first locking member 20, are integral pins 30 mounted coaxially with the arcuate bearing surface of the cradle 28. Extensions of the two spring U-shaped central portion 24a of the spring lie on each side of the locking members, in the form of angled limbs 32 in the bends 34 of which the pins 30 of the first member are seated.

Figure 2:
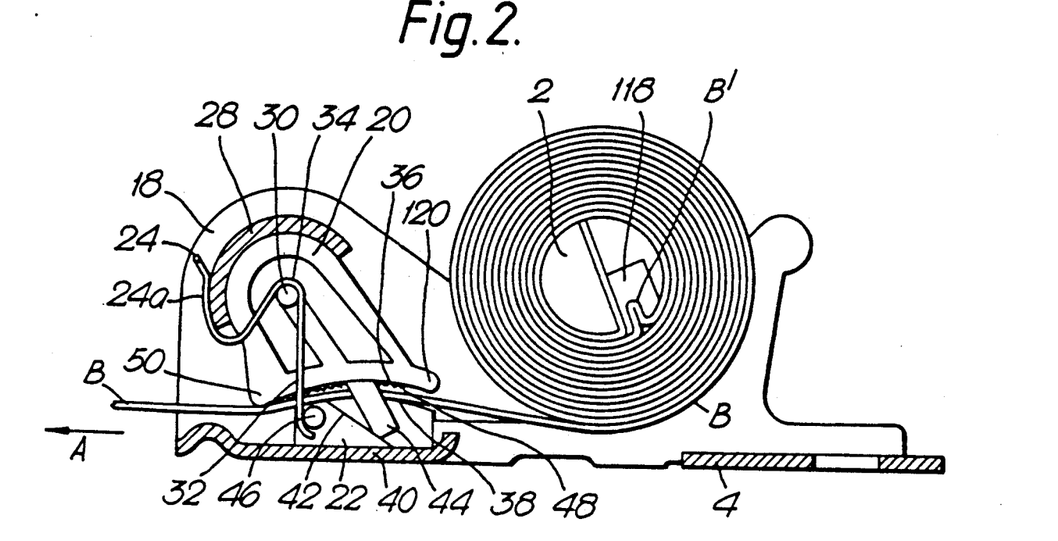
FIGS. 2 and 3 illustrate the locking mechanism for the belt web in its unlocked and locked states respectively.
Figure 3:
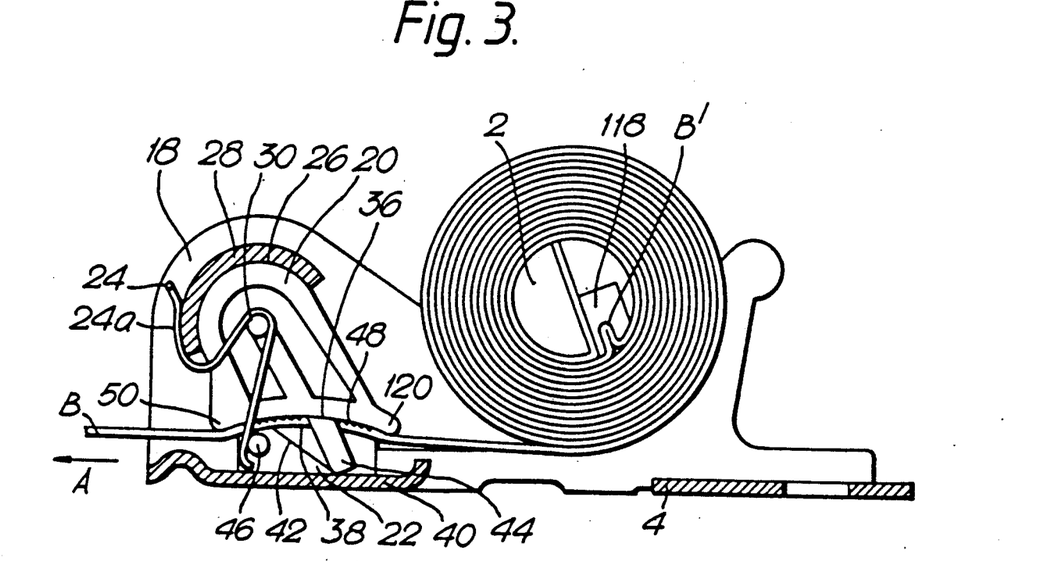

The bottom face 36 of the first locking member has a concave shape and opposed to it is a complementary top face 38 of the main body of the second member 22, which rests on bottom wall 40 of the frame. To each side of the main body the second member 22 has flanks with inclined faces 42 that are engaged by integral spigots 44 that extend downwards from the first member 20. Pins 46 project from the sides of the flanks of the lower member 22 to engage the lower extremities of the spring limbs 32. The second member 22 is thus held between the spigots 44 of the first member and the spring limbs 32 so that, in an equilibrium position of the two members, the gap between them is greater than the web thickness. In this state the web B can move freely through the locking mechanism, and in particular is kept clear of gripping teeth 48 on the bottom face 36 of the first locking member because of the concave form of that face, and in particular its front nose 50.

If the second locking member 22 is moved forwards (direction A of pay-out of the belt) against the force of the spring limbs 32, the web becomes clamped between the members. Some forward pivoting of the first locking member in its cradle will also occur, bringing the teeth 48 into full engagement with the belt. It is a characteristic of the manner in which the first and second locking members 20, 22 are mounted that their complementary arcuate surfaces align themselves automatically with each other when they grip the belt so that an effective clamping action is ensured. This clamping action can be maintained by the belt tension, even if the second member 22 is otherwise free to return to the original equilibrium position. Once the tension in the belt is released, of course, the spring 24 urges the locking members 20, 22 towards their original positions to release the web. To achieve this the spring 24 urges the pins 46 to the right (FIGS. 2, 3 and 6 to 9), and the inclined faces 42 act on spigots 44, to tilt first locking member 20 anticlockwise.

Within the mechanism cassette 8, to effect the locking of the belt, there are mechanisms responsive to the rate of withdrawal of the web from the spool and to the acceleration or deceleration of the vehicle in which the safety belt is being used, when any of these parameters exceeds predetermined limits.

The mechanism reacting to an increased rate of withdrawal of the web comprises a sensing disc 52 (FIG. 4) splined to the spindle 2. On a pivot 54 on the disc 52 is a sensing pawl 56 biased into an inoperative end position (FIG. 4) by a compression spring 58, the ends of which are mounted on respective projecting 60, 62 on the disc and on an inner face of the pawl. Concentric with the sensing disc and freely rotatable with respect thereto about the hub axis is a control disc 64 having ratchet teeth 66 opposed to the pawl. A further concentrically mounted sub-assembly comprising an inertia mass 73, 77 and a ratchet wheel 72 is held together by clips 74 which permit them to rotate relative to each other about the hub axis, this rotation being constrained, however, by a torsion spring 76 attached by its opposite ends to respective hooks 78, 80 on the ratchet wheel and the inertia mass respectively. The inertia mass sub-assembly is held on the sensing disc 52 by clips 82 that allow relative rotation of the sensing disc. Such rotation of the inertia mass sub-assembly relative the sensing disc is normally blocked by a projection 84 of the inertia mass which engages an oblique face 86 of the sensing pawl 56.

Figure 4:
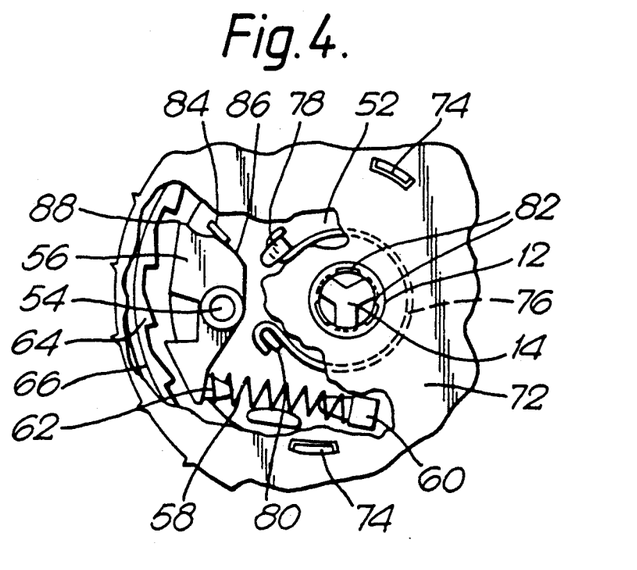
FIGS. 4 and 5 are detail views illustrating the inertia locking mechanism in its unlocked and locked states.
Figure 5:
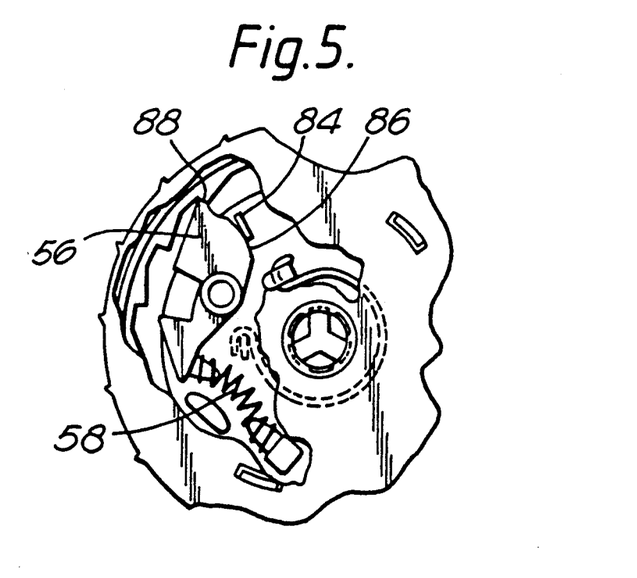

If the web is drawn out (arrow A) from the spindle 2 at a relatively low speed without jerking (i.e. under a low G force), the inertia mass sub-assembly will rotate with the sensing disc 52, being carried round by the engagement of the inertia mass projection 84 with the pawl 56. When the web is subjected to higher G forces, because of the resistance of the inertia mass to acceleration, the reaction force of the projection 84 on the pawl can increase to produce a moment on the pawl which causes the compression spring 58 to buckle elastically and the pawl is snapped over to engage its tip 88 in the toothed control disc 64.

The spindle 2, sensing disc 52 and control disc 64 are then locked to rotate together. An outer stirrup 90 (FIG. 6) integral with the control disc 64 surrounds a pin 92 projecting laterally from an extension arm 94 of the second locking member 22. As the control disc 64 rotates with the sensing disc 52, it therefore displaces the pin 92 and with it the second locking member 22, forwards. As already described, the two locking members are thereby brought together to clamp the web. To allow for dimensional variations in manufacturing, the stirrup is wide enough to provide some lost motion between the control disc 64 and the second locking member 22. When the tension is reduced sufficiently to free the web, the locking members 20, 22 are moved apart causing the control disc to return to its original position and hence, due to the action of the compression spring, to release the pawl 56.

Figure 8:
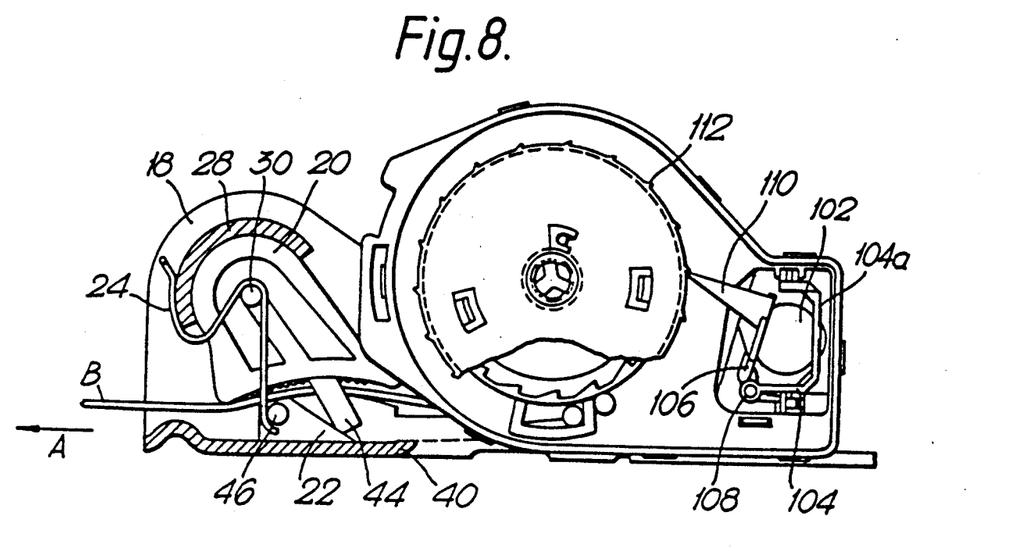
FIG. 8 illustrates the operation of the vehicle sensing means on the locking mechanisms.

In a further aspect of the invention a mechanism is provided which will cause the web to be locked as a result of excessively sharp acceleration or deceleration or of excessive tilting of the vehicle, in particular about a fore and aft axis. The mechanism comprises a ball 102 movably held in a cage 104 fixed within the mechanism cassette. The ball rests in a conical seating (not shown) in the bottom wall 104a of the cage (the complete retainer mechanism being oriented with the wall 104a substantially horizontal and lowermost). A lever plate 106 mounted on a horizontal pivot 108 has a hollow conical face resting on the top of the ball as so retains the ball within the cage. If a sufficient inertia force acts in any horizontal direction the ball will be displaced from its rest position and, because of the conical form of the faces engaging it above and below, will swing the lever plate 106 upwards. This pivoting of the lever plate can occur therefore by the ball rolling due to a sudden acceleration or deceleration of the vehicle or due to the vehicle tilting excessively to one side or the other. A detent 110 projects from the lever plate 106 to be engageable with teeth 112 in the ratchet wheel 72 if such movement of the ball occurs.

The effect is then to arrest the ratchet wheel coupled to the inertia mass so that if the spindle tries to rotate to pay out web, i.e. because the wearer of the belt has swayed forwards or sideways on account of the movement of the vehicle, the inertia mass continues to rotate against the torsion spring 76, engaging the pawl 56 in the control disc 64 and operating the locking mechanism through the pin 92 of the second locking member 22 as previously described.

Figure 9:
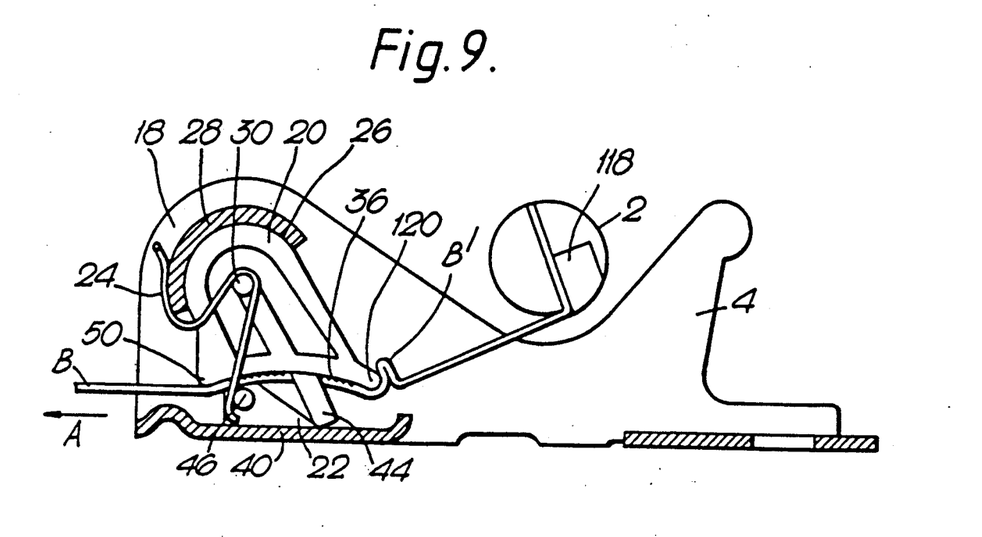
FIG. 9 illustrates the operation of the locking means to grip the fully paid-out web.

The locking members 20, 22 may also be employed as a lock for the end of the web to prevent undue strain on the spindle 2 when the web has been paid out. For this purpose, near that end of the web secured to the spindle, a projection is provided on the face of the web directed towards the first locking member 20. This projection is conveniently in the form of a small loop B' sewn into the web near its inner end and normally housed in recess 118 in the spindle. As the loop is reeled off the spindle, it abuts against the rear edge 120 of the upper member 20 as shown in FIG. 9, so forcing the member to rotate forwards in its cradle 28. The second locking member is entrained by the spigots 44 of the upper member and so the members come together to clamp the web. As before, when the tension is removed from the web the web is released.

Figure 10:
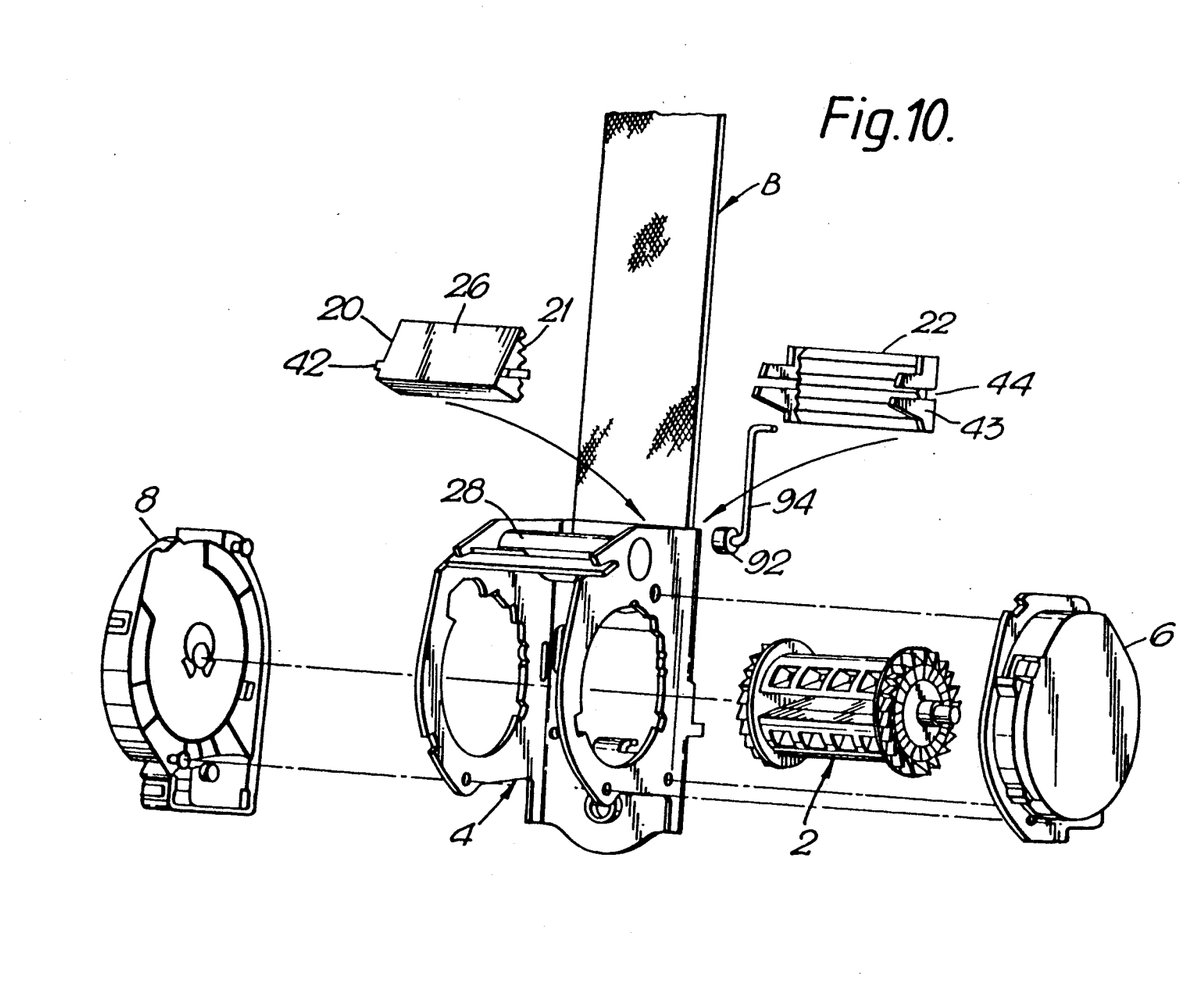
FIG. 10 is an exploded view of the main components of a second embodiment of mechanism according to the invention.
Figure 11:
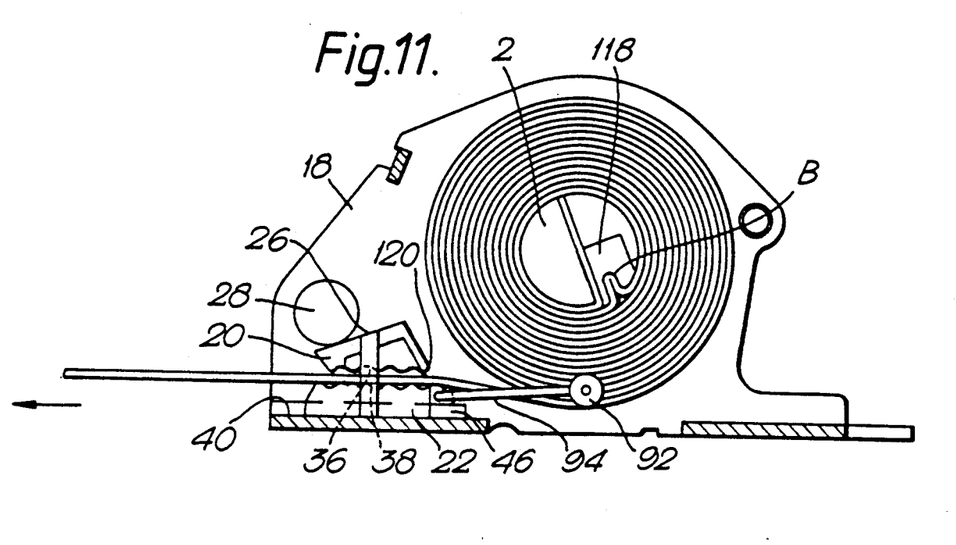
FIG. 11 and 12 illustrate the locking mechanism of FIG. 10 for the belt web in its unlocked and locked states respectively.
Figure 12:
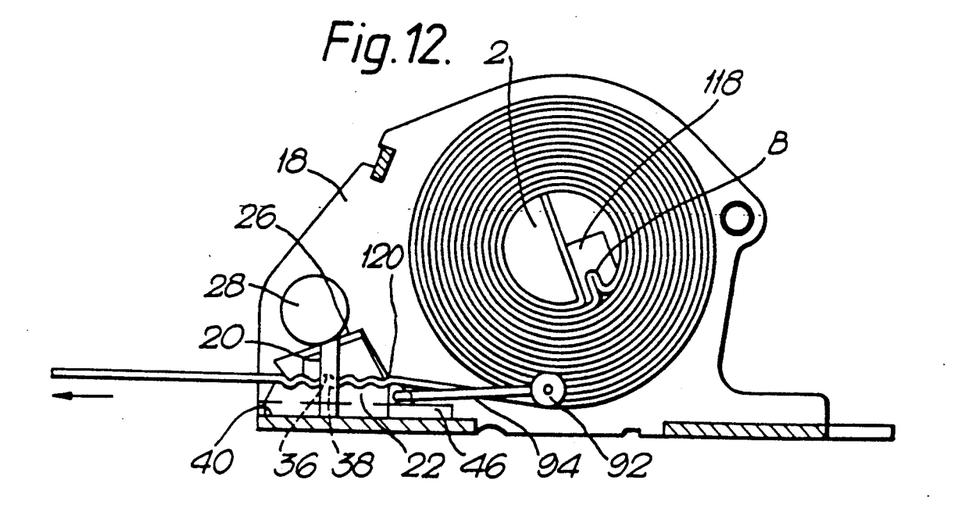

Referring to FIGS. 10, 11 and 12, like parts have been indicated by like reference numerals. The basic difference here, however, is the construction of the first and second locking members 20 and 22. These members can be made, for example, of moulded plastic or of die-cast aluminium or similar metal. The member 20 has an undulating clamping face 36, and opposite that clamping face inclined surface 26, which is angled with respect to the general claim of the undulating face 36. The inclined surface 26 is positioned adjacent a pin 28.

The second locking member 22 is mounted adjacent the web 40 of the frame 4 so as to be capable of translational sliding movement relatively thereto. The member 22 has a complementary undulating face 38 to the undulating face 36 of the first member 20. Extending transversely to its sliding movement from the second member 22 are arms 43 having slots 44 formed therebetween. These slots accommodate laterally extending spigots 42 on the first locking member 20 and thereby provide a lost motion link between the first and second members.

It will be appreciated that as the second locking member 22 is moved to the left as seen in FIG. 11 and 12 (in practice upwardly) the first member is caused to move with the second member and the inclined surface 26 and the surface of the pin 28 urge the second member towards the first thereby clamping the web B between the undulations 36, 38.

Figure 6:
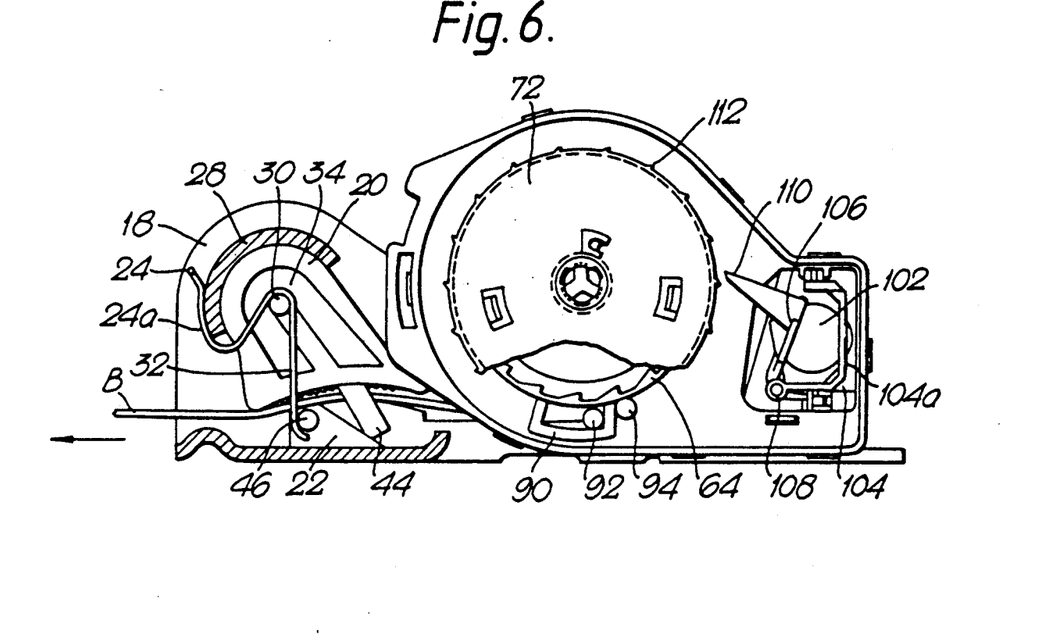
FIGS. 6 and 7 are a further pair of illustrations of the mechanisms in the locked and unlocked states and show the interaction of the inertia locking mechanism with the web locking mechanism.
Figure 7:
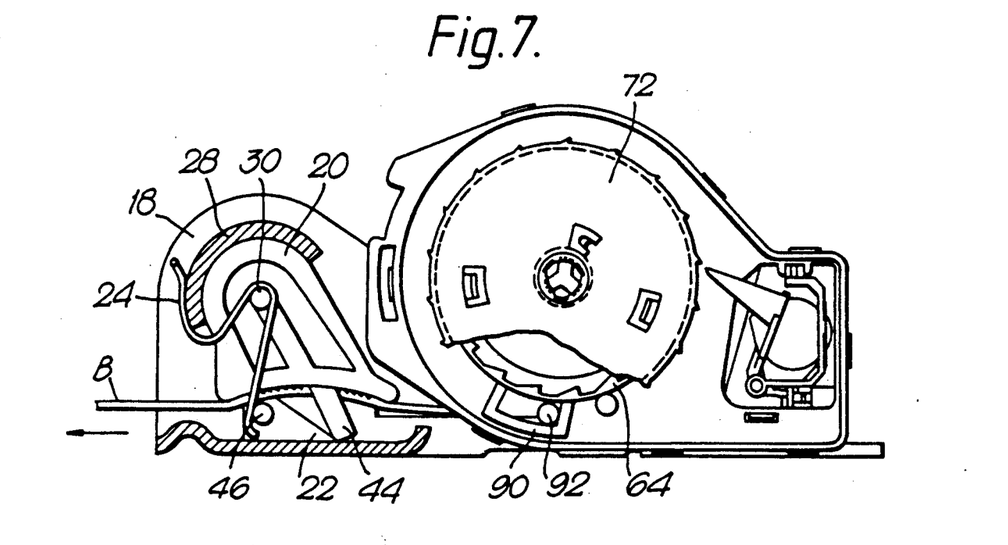

The actual mechanisms used for moving the second locking member 22 are not shown in detail in FIGS. 11 and 12 and can be the same as in the structure of the first embodiment, for example as shown in FIGS. 4 and 5, as shown in FIGS. 6 and 7 and/or as shown in FIGS. 8 and 9.

It will be appreciated that this structure is very simply and inexpensive to manufacture and it is not significantly bigger than a conventional frame locking retractor. Because the reel can be made of a plastics material the cost can be no greater than that of a conventional frame locking wheel with a metal spindle.

We claim:

1. A locking mechanism for a safety belt comprising a frame,
   a retraction reel for the web of said belt mounted on said frame,
   a first locking member pivoted on said frame and having a concave belt web engaging face,
   a second locking member slidably supported by said frame and having a convex belt web engaging face juxtaposed to the convex face on said first locking member,
   means resiliently biasing said locking members to a position in which the juxtaposed concave and convex faces thereon are spaced apart to provide for free travel of said belt web, and
   means for displacing said second locking member against said bias thereby to move the faces on said first and second locking members toward one another to clamp said belt web therebetween, movement of said second locking member effecting pivotal movement of said first locking member whereby its concave face moves closer to the convex face of the second locking member so as to positively grip said belt web therebetween.

2. A mechanism as claimed in claim 1, comprising a further comprises a spring to resiliently bias said second locking member axially urging said second locking member, a 3. A mechanism as claimed in claim 1, wherein the means to cause displacement of the second locking member against said bias include, means sensitive to the speed of rotation of said reel, whereby when the speed exceeds a certain value, said members are moved relatively towards one another.

4. A mechanism as claimed in claim 3, wherein said means sensitive to the speed of rotation of the reel comprise an inertia mass and a ratchet wheel clips holding said inertia mass and ratchet wheel together said clips permitting said inertia mass and ratchet wheel to rotate relatively to each other about the axis of the reel, a torsion spring attached to the ratchet wheel and the inertia mass to constrain relative movement therebetween, a sensing disc attached to the reel, a sensing pawl pivotally mounted on the sensing disc, a control disc freely rotatable about the axis of the reel, ratchet teeth opposed to the pawl and a spring biasing the pawl out of engagement with the ratchet teeth, whereby when the inertia mass is moved, due to sufficient speed of rotation of the reel, the pawl is pivoted, against the action of said spring, so that it engages the ratchet teeth and causes the control disc to rotate, rotation of the control disc causing movement of said second locking member.

5. A mechanism as claimed in claim 3, wherein said means to cause displacement of said second locking member against said bias comprises a ratchet wheel carried by said reel, a pivotally mounted lever, a detent carried by said lever and engageable with the teeth of said ratchet wheel, a cage, a ball moveable in said cage upon acceleration, deceleration or cornering of the vehicle in which the mechanism is mounted, effective to move said detent into engagement with said ratchet teeth to prevent rotation thereof, whereafter any unreeling of the web will cause said inertia mass to continue to rotate and engage the pawl in the control disc, thereby to move the second locking member.

6. A mechanism as claimed in claim 1, wherein said means to cause displacement of said first locking member against the bias comprises a transversely projecting element on the web engageable with said first locking member to cause translational movement thereof.

* * * * *

UNITED STATES PATENT AND TRADEMARK OFFICE
CERTIFICATE OF CORRECTION

PATENT NO. : 5,039,025

DATED : August 13, 1991

INVENTOR(S) : Harry Hanna and William E. Heaney

It is certified that error appears in the above-identified patent and that said Letters Patent is hereby corrected as shown below:

Col. 6, lines 40-42, delete in their entirety and in place insert --spigot on the first member and an inclined face on the second locking member engaged by said spigot to maintain the concave and convex faces normally spaced by distance greater than the thickness of the web.--

Signed and Sealed this

Sixteenth Day of February, 1993

Attest:

STEPHEN G. KUNIN

Attesting Officer

Acting Commissioner of Patents and Trademarks